United States Patent
Chowdhury et al.

(10) Patent No.: US 7,701,896 B1
(45) Date of Patent: Apr. 20, 2010

(54) DYNAMIC HOME AGENT METHOD AND APPARATUS FOR MOBILE INTERNET PROTOCOL

(75) Inventors: Kuntal Chowdhury, Plano, TX (US); Peter Barany, San Diego, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1262 days.

(21) Appl. No.: 10/698,245

(22) Filed: Oct. 30, 2003

(51) Int. Cl.
*H04Q 7/00* (2006.01)

(52) U.S. Cl. ............ 370/328; 370/331; 370/338; 455/435.1; 455/433

(58) Field of Classification Search ........ 370/328, 370/352, 392, 401, 410, 455, 395.31, 338, 370/331; 455/433, 436, 435.1, 422.1, 432
See application file for complete search history.

(56) References Cited

U.S. PATENT DOCUMENTS

| | | | |
|---|---|---|---|
| 7,167,466 B2 * | 1/2007 | Chowdhury et al. | 370/349 |
| 7,269,173 B2 * | 9/2007 | Iyer et al. | 370/395.31 |
| 7,346,684 B2 * | 3/2008 | Borella | 709/225 |
| 7,366,145 B2 * | 4/2008 | Flinck | 370/338 |
| 7,475,241 B2 * | 1/2009 | Patel et al. | 713/155 |
| 7,489,667 B2 * | 2/2009 | Faccin et al. | 370/338 |
| 2002/0086671 A1 * | 7/2002 | Amin et al. | 455/432 |
| 2002/0129150 A1 * | 9/2002 | Jung | 709/227 |
| 2003/0229697 A1 * | 12/2003 | Borella | 709/226 |
| 2004/0032844 A1 * | 2/2004 | Lewis et al. | 370/338 |
| 2004/0049532 A1 * | 3/2004 | Oka et al. | 709/202 |
| 2004/0249952 A1 * | 12/2004 | Roderique | 709/227 |
| 2005/0020265 A1 * | 1/2005 | Funabiki et al. | 455/436 |

* cited by examiner

*Primary Examiner*—CongVan Tran (57) ABSTRACT

In accordance with the teachings of the present invention, a method and apparatus is presented for registering a mobile IP node with a home agent. A self-selection method is implemented in a home agent. When a home agent receives a registration request from the mobile node, the self-selection method enables each home agent to independently and randomly generate a value that falls within a range of numbers. Each range of numbers is referred to as a bin. In addition, each home agent is associated with at least one of bin. If the value falls within the bin, the home agent associated with the bin responds to the registration request. In addition, home agents are uniformly selected relative to other home agent on the network; therefore, implementing the self-selection method performs load balancing in the network.

28 Claims, 6 Drawing Sheets

DYNAMIC HOME AGENT METHOD AND APPARATUS FOR MOBILE INTERNET PROTOCOL

BACKGROUND OF THE INVENTION

1. Field of the Invention

This invention relates to communication networks.

2. Description of the Prior Art

The modern Internet includes an interconnection of both wireless and wireline networks. In the case of wireless networks, mobile nodes, such as a mobile telephone, require a mechanism for maintaining contact and registration with the network as the mobile node moves through different access and attachment points in the network. In addition, as the mobile node moves to different access and attachment points, the network needs to be able to properly identify and forward calls to the mobile node.

To facilitate this process network protocols, such as the Internet Protocol (IP) version 6 (i.e., Ipv6), promulgated by the Internet Engineering Task Force have been established. Ipv6 or "mobile IP," as it is often referred to, is intended to enable mobile nodes to move from one attachment point in a network to another attachment point in the network. As such, mobile IP is a communication protocol, which enables the mobile node to communicate from different attachment points and serves as a mechanism for the network to identify and communicate with the mobile node as the mobile node moves to different attachment points in the network.

Mobile IP is designed for use across homogeneous medias as well as heterogeneous media. For example, mobile IP facilitates attachment from one Ethernet segment to another as well as attachment from an Ethernet segment to a wireless Local Area Network (LAN), etc.

A number of architectural components have been defined in the mobile IP protocols, such as Request For Comments (RFC) 3344, published August 2002 by the Internet Engineering Task Force. Notable components include a mobile node, a home agent, and a foreign agent. A mobile node is defined as a host or router that changes its point of attachment from one network or sub-network to another. A mobile node may change its location without changing its IP address. The mobile node may continue to communicate with other Internet nodes from different locations using its constant IP address, assuming connectivity to a point of attachment is available.

A home agent is defined as a router on a mobile node's home network, which tunnels datagrams for delivery to the mobile node when the mobile node is away from home and maintains current location information on the mobile node. A foreign agent is a router on a mobile node's visited network, which provides routing services to the mobile node while registered. The foreign agent detunnels and delivers datagrams to the mobile node that were tunneled by the mobile node's home agent. For datagrams sent by a mobile node, the foreign agent may serve as a default router for registered mobile nodes. As defined in RFC 3344, when the mobile node is away from home, it registers its "care of address" with its home agent. Depending on its method of attachment, the mobile node will register either directly with its home agent or through a foreign agent, which forwards the registration to the home agent.

In addition, RFC 3344 defines a dynamic home agent discovery procedure, in which a mobile node discovers a home agent during the registration process. RFC 3344 refers to this discovery process as "dynamic home agent address resolution."

In the first step of the dynamic home agent address resolution procedure, the mobile node sends a mobile IP registration request message with a home agent field located in the registration request message set to the network broadcast address of its home network. The receiving home agents on the home network send registration reply messages to the mobile node with an error code 136. In the registration reply messages, the home agents insert their unicast IP address in the home agent field. In the second step of the process, the mobile node selects one home agent and sends a new registration request message to that home agent with the home agent field in the registration request message set to the unicast IP address of a specific home agent.

This conventional registration process is inefficient in wireless networks. In addition, the current method of registration includes a number of shortcomings. For example, 1) a mandatory double roundtrip is required to accomplish registration with the conventional registration process; 2) all the home agents receiving the initial registration request message must respond with an error code 136. The overhead to carry these registration reply messages from a variable number of home agents may become significant over a wireless network link and use the limited radio resources that are available in a wireless network; 3) prior to the completion of the registration process, the mobile node and the applications running on the mobile node cannot start to use other intended services, the resulting delay may be critical for certain services; 4) the processing overhead for the mobile node is high when too many home agents respond to the initial registration request message; and 5) there is no control over which home agent the mobile node chooses for registration; as a result, it is difficult for a network operator to perform load balancing in the network.

Thus, there is a need for a new method and apparatus for performing registration in a mobile IP environment. There is a need for a method of reducing the roundtrip communication required by the current mobile IP registration process. There is a need for a method of minimizing the use of valuable radio resources in the current mobile IP registration process. There is a need for a method of reducing the delay in the current mobile IP registration process. There is a need for a method of reducing the processing overhead of the mobile node when registering with a home agent. There is a need for a mobile IP registration process that facilitates load balancing in the network.

SUMMARY OF THE INVENTION

A method and apparatus for registering mobile nodes in a mobile IP environment is presented. In one embodiment, the method and apparatus eliminates the need for double roundtrip communication required to register a mobile node. In a second embodiment, the method reduces the overhead and processing required by the network and the mobile node by enabling a single self-selected home agent to respond to a registration request. In a third embodiment, the method facilitates load balancing of home agents operating on the network. In a fourth embodiment, the registration process facilitates the use of critical network services prior to the completion of the registration process.

In one embodiment, a mobile node sends registration information, such as a registration request. Each home agent receiving the registration request independently operates a pre-configured, self-selection method, which enables one of the home agents to independently identify itself (i.e., self-select) as the home agent that should respond to the registration request. The mobile node is then able to register with the responding home agent.

In one embodiment, each home agent is associated with a predefined range of numbers known as a bin. In addition, each home agent is pre-configured with a self-selection method that independently operates on each home agent. The self-selection method generates a VALUE. When the VALUE falls within the predefined range or bin, the home agent associated with the predefined range or bin responds to a registration request. In one embodiment, the home agent performs self-selection or self-selects by performing the self-selection method, generating the VALUE, and determining that the VALUE falls within a bin or range.

In another embodiment, a mobile node retransmits previously transmitted registration information. The retransmitted registration information includes information that identifies the retransmitted registration information as a retransmission of an initial registration request (i.e., registration information). Each home agent receives the retransmitted registration information. In one embodiment, each home agent receives the retransmitted registration information and executes a self-selection method using the retransmitted registration information as an input. As a result, a single home agent self-selects and responds to the retransmitted registration information.

A tiered bin method is implemented. In the tiered bin method, each home agent is associated with more than one non-overlapping range of numbers or bins. For example, one home agent will have primary responsibility for a bin and a second home agent will have secondary responsibility for the bin. As a result, in the tiered bin method, once each home agent identifies the retransmitted registration information as a retransmission of an initial registration request, the home agent with secondary responsibility for the registration request, self-selects and responds to the retransmitted registration information.

A method of registering a mobile node comprises the steps of receiving registration information; performing a self-selection method in response to receiving the registration information; and responding to the registration information in response to performing the self-selection method.

A method of registering a mobile node comprises the steps of receiving registration information; generating a value that falls within a range of numbers in response to receiving the registration information; comparing the value to a predefined range of numbers in response to generating the value; and if the value falls within the predefined range of numbers, responding to the registration information.

A method of registering a mobile node comprises the steps of receiving registration information; identifying the registration information as a retransmission of a registration request in response to receiving the registration information; generating a value in response to identifying the registration information as a retransmission of a registration request; comparing the value to a predefined range of numbers in response to generating the value; and if the value falls within the predefined range of numbers, responding to the registration information.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
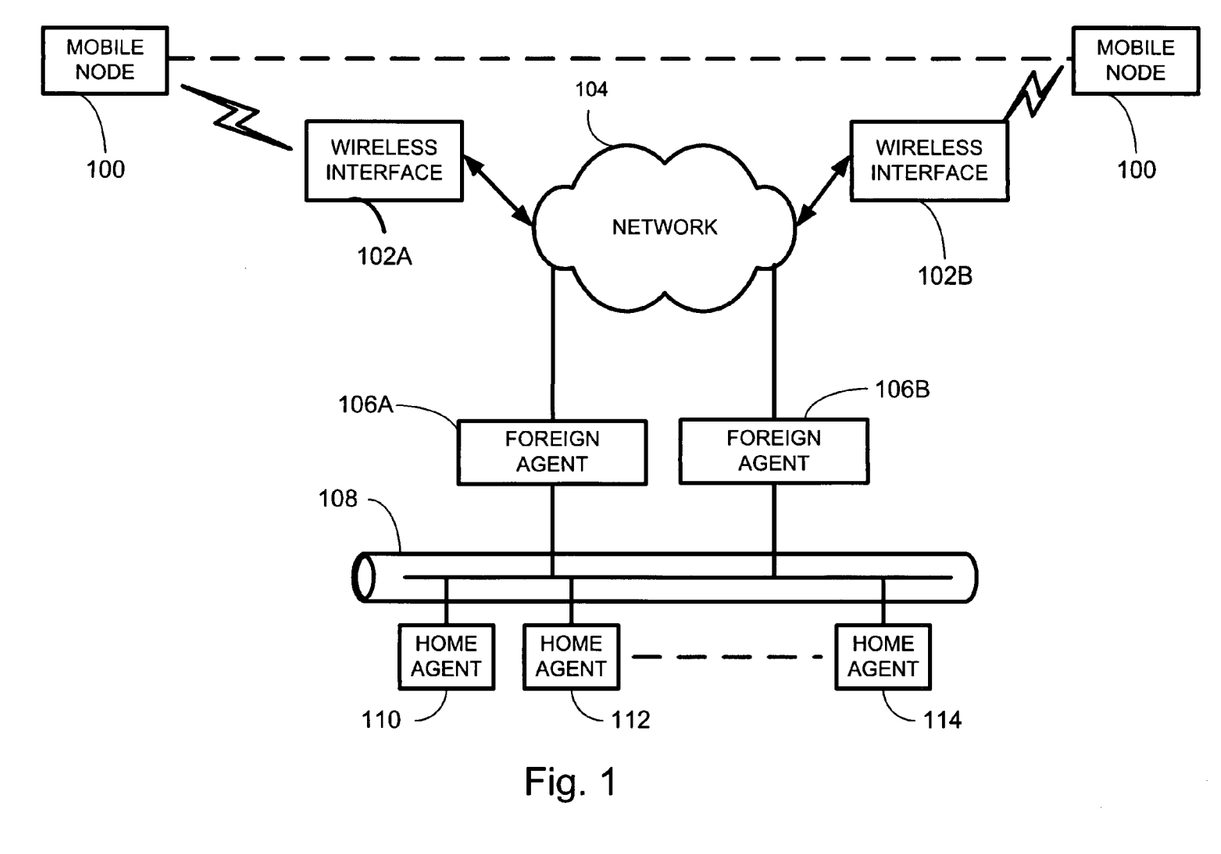
FIG. 1 displays a network implementing the teachings of the present invention.

FIG. 1 displays a network implementing the teachings of the present invention. A mobile node 100 is shown. The mobile node 100 may be implemented with a variety of wireless and wireline devices, such as a cellular telephone, Personal Data Assistant (PDA), laptop computer including a wireless and/or wireline interface, etc. For example, in one embodiment, the mobile node 100 may be any device compliant with the family of standards promulgated by the $3^{rd}$ Generation Partnership Project 2 (3GPP2).

In FIG. 1, the mobile node 100 is in communication with a wireless interface 102A/102B as an illustration. In one embodiment, the wireless interface 102A/102B may include the radio interface for receiving wireless transmissions and a base station for communication with a network. The wireless interface 102A/102B communicates with a network 104. A foreign agent 106A/106B is also in communication with the network 104. In one embodiment, the foreign agent 106A/106B is a foreign agent as defined in RFC 3344. The foreign agent 106A/106B may be implemented with a computer architecture, such as a server on a customer premises. In another embodiment, the foreign agent 106A/106B may be implemented as a router deployed in a network. The foreign agent 106A/106B is in communication with home agents 110, 112, and 114 through network 108. In one embodiment, the foreign agent 106A/106B and the home agents 110, 112, and 114 are implemented as defined by RFC 3344. It should also be appreciated that home agents 110, 112, and 114 represent any number of home agents.

During operation, the mobile node 100 communicates with the wireless interface 102A/102B. The wireless interface 102A/102B forwards the communication across network 104 to the foreign agents 106A and/or 106B. The foreign agents 106A and/or 106B communicate with home agents 110, 112, and 114 through network 108. In the reverse direction, home agents 110, 112, and 114 communicate information to foreign agents 106A and/or 106B across network 108. The foreign agents 106A and/or 106B communicate with the wireless interface 102A/102B across network 104. Lastly, the wireless interface 102A/102B communicates with the mobile node 100.

The mobile node 100 may move to a different location and as a result, may communicate with network 104 through different attachment points. For example, at time T1, mobile node 100 may communicate with network 104 through a first attachment point. For example, wireless interface 102A may serve as the first attachment point. At time T2, the mobile node 100 may move to another location and communicate with network 104 using a different attachment point. For example, wireless interface 102B may serve as a second attachment point. When the mobile node 100 moves from wireless interface 102A (i.e, attachment point) to wireless interface 102B (i.e., attachment point), the mobile node 100 may connect through foreign agent 106B. When the mobile node 100 connects through the foreign agent 106B, the mobile node 100 will once again register with a home agent (i.e., 110, 112, 114). In addition, if the mobile node 100 initiates communication for the first time or re-initiate communication after loosing communication, the mobile node 100 has to register with a home agent (i.e., 110, 112, 114). In one embodiment, during the mobile IP registration process, the mobile node 100 communicates directly with the first foreign agent 106A and/or the foreign agent 106B.

During operation, information is communicated from the mobile node 100 across attachment points (i.e., wireless interface 102A or 102B), across the network 104, through the foreign agents 106A and/or 106B, to the home agents 110, 112, and 114. In an alternate embodiment, the mobile node 100 may communicate through a wireless interface 102A/102B, such as a wireless Local Area Network base station (i.e., I.E.E.E. 802.11), directly across network 108 to the home agents 110, 112, and 114. In addition, it should be appreciated that any combination of network scenarios and network components displayed in FIG. 1 may be implemented and still remain within the scope of the present invention. For example, in one embodiment, the wireless interface 102A/102B may communicate directly with the foreign agent (106A, 106B). In another embodiment, the wireless interface 102A/102B may communicate with the network 104, and the network 104 may be directly connected to the network 108 without the use of the foreign agent (106A, 106B), etc.

Figure 2:
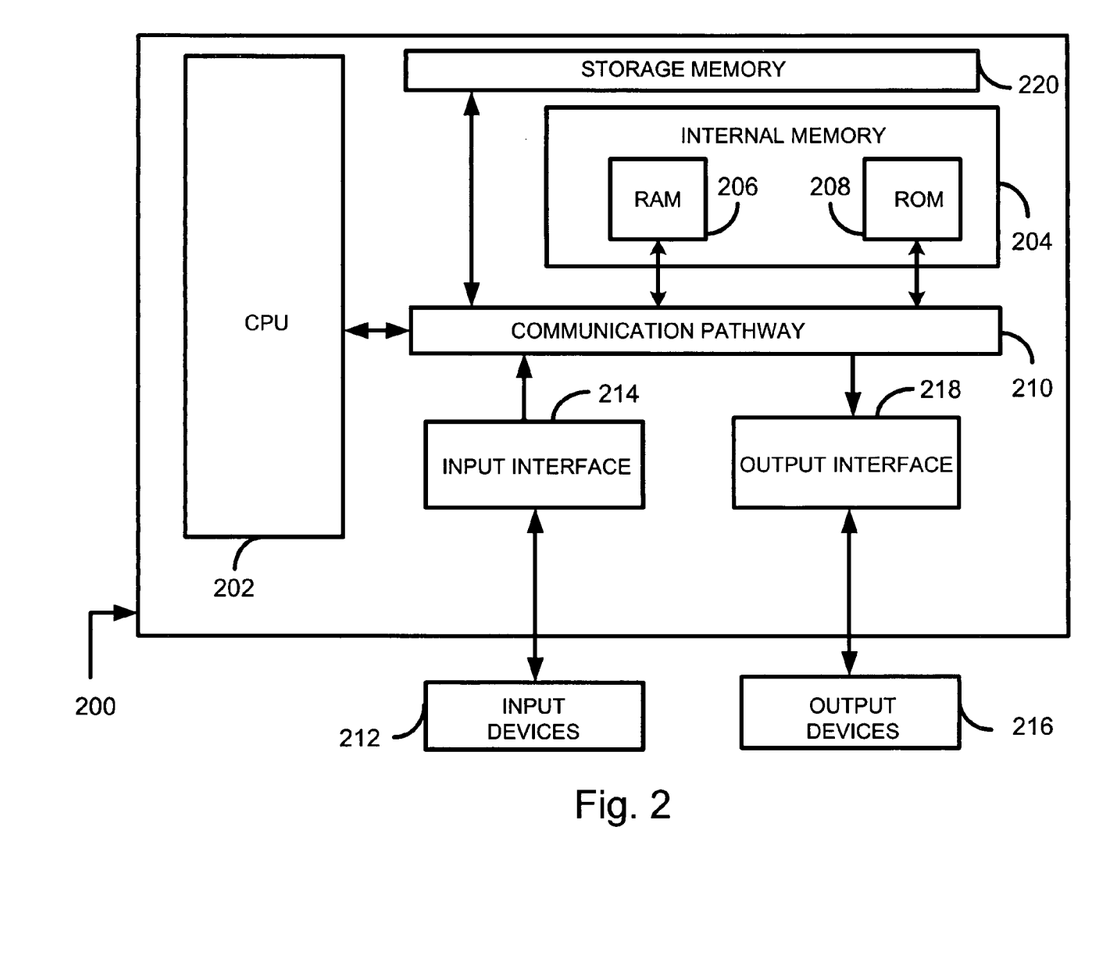
FIG. 2 displays a block diagram of a computer implemented in accordance with the teachings of the present invention.

In one embodiment, the mobile node 100, the wireless interfaces 102A and 102B, the network 104, the foreign agents 106A and 106B, the network 108, and the home agents 110, 112, and 114 may be implemented with computer architecture. In FIG. 2, a block diagram of a computer architecture implemented in accordance with the teachings of the present invention is shown. A central processing unit (CPU) 202 functions as the brain of the computer architecture 200. Internal memory 204 is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 may be any memory residing within the computer architecture 200 other than internal memory 204. In one embodiment of the present invention, storage memory 220 is implemented with a hard drive. A communication pathway 210 is used to communicate information within computer architecture 200. In addition, the communication pathway 210 may be connected to interfaces, which communicate information out of the computer architecture 200 or receive information into the computer architecture 200.

Input devices, such as tactile input device, joystick, keyboards, microphone, communications connections, or a mouse, are shown as 212. The input devices 212 interface with the system through an input interface 214. Output devices, such as a monitor, speakers, communication connections, etc., are shown as 216. The output devices 216 communicate with computer architecture 200 through an output interface 218.

Figure 3A:
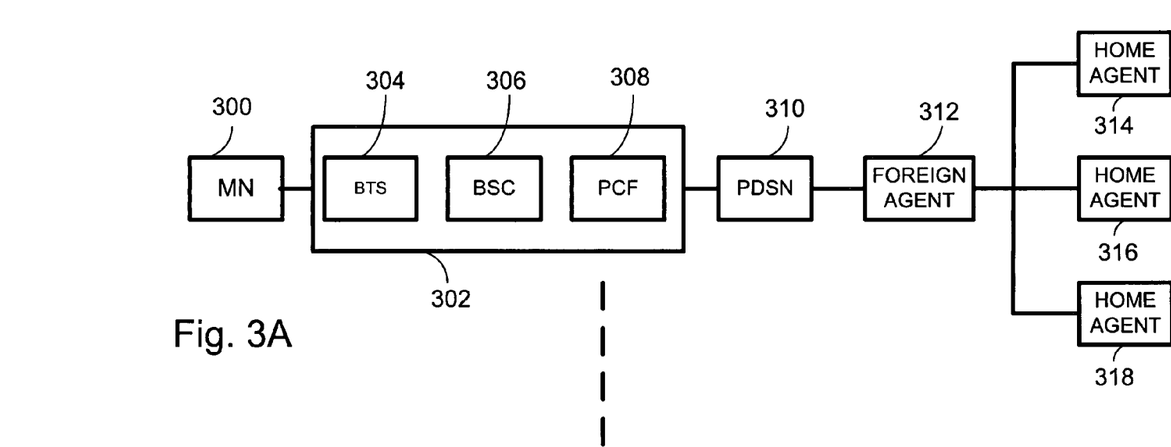
FIG. 3A displays a message flow diagram depicting a wireless implementation of the teachings of the present invention.

FIG. 3A displays a diagram depicting a wireless implementation of the teachings of the present invention. In a wireless implementation, such as a CDMA 2000 implementation, mobile node (MN) 300 communicates with a radio access network 302. In one implementation, the radio access network 302 serves as a wireless interface and includes a Base Transceiver Station (BTS) 304, a Base Station Controller (BSC) station 306, and a Packet Control Function (PCF) 308. A message flows from the radio access network 302 to a Packet Data Service Node (PDSN) 310, which also serves as a Foreign Agent. Messages then flow to a foreign agent 312, which ultimately communicates the messages to home agents 314, 316, and/or 318. A response (i.e., registration response) would traverse the architecture depicted by FIG. 3A in the reverse direction.

Figure 3B:
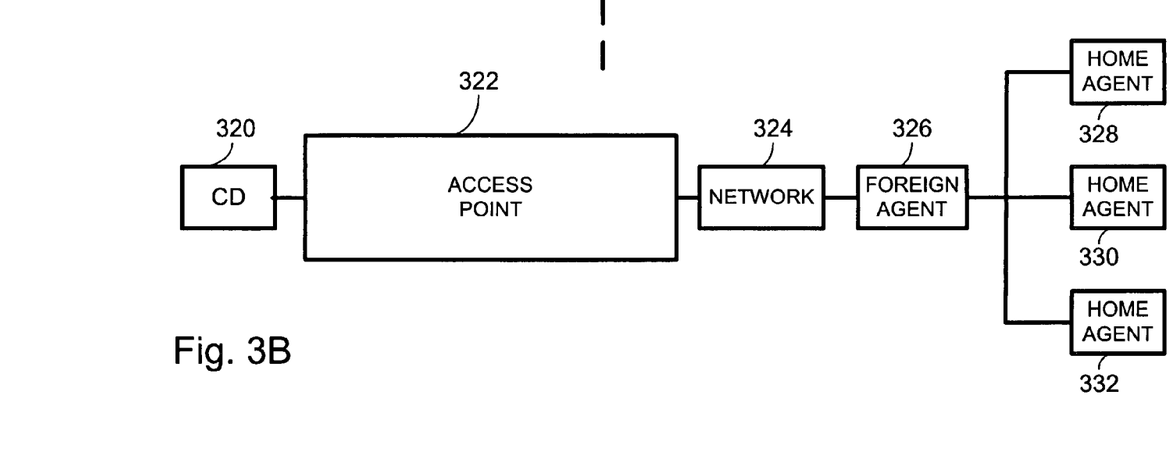
FIG. 3B displays a message flow diagram depicting a wireline implementation of the teachings of the present invention.

FIG. 3B displays a diagram depicting a wireline implementation of the teachings of the present invention. A computing device (CD) 320 generates a message. In one embodiment, the CD 320 may be a wireless LAN-compliant device, such as an Institute for Electrical and Electronic Engineers (I.E.E.E.) 802.11 compliant Local Area Network device. As such, the messages (i.e., such as registration request) would flow to an access point 322, which may be implemented as a wireless base station. A message may then flow across a network 324 through a foreign agent 326 to home agents 328, 330, and/or 332. In another embodiment, the CD 320 may be a Local Area Network-compliant device, such as an I.E.E.E. 802.3 device. As such, the access point 322 may be implemented with a docking station, an Ethernet connection, etc. A message would flow from the access point 322 across a network 324 to a foreign agent 326. The foreign agent 326 may then communicate with home agents 328, 330 and/or 332. A response (i.e., registration response) would traverse the architecture depicted by FIG. 3B in the reverse direction.

Figure 4:
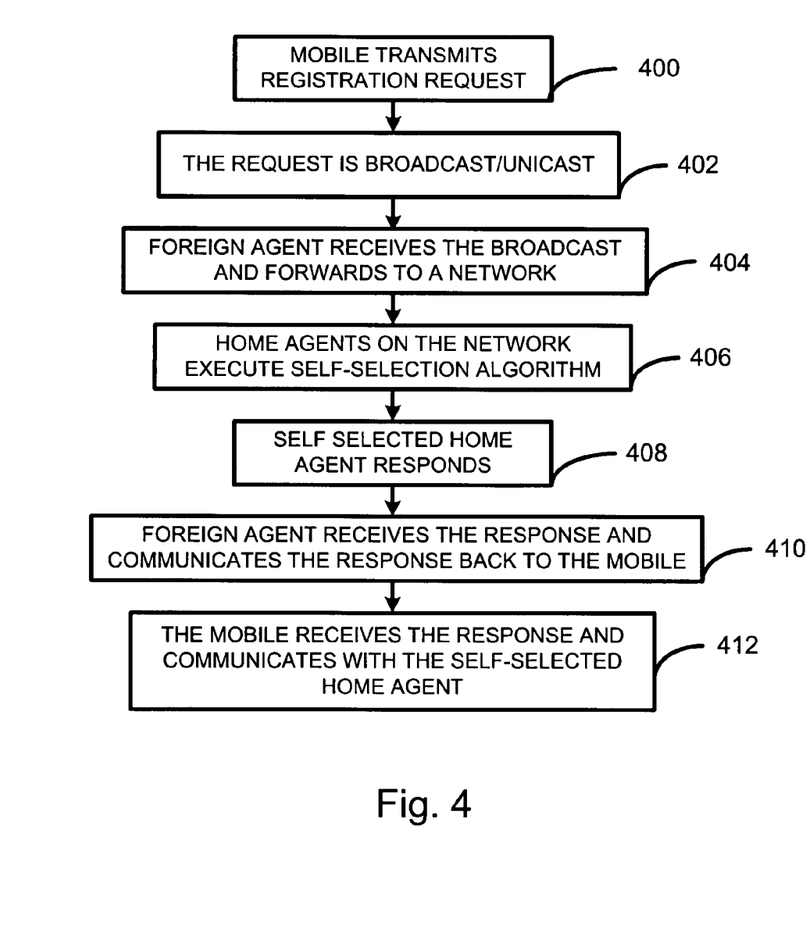
FIG. 4 displays a flow diagram of a registration process implemented in accordance with the teachings of the present invention.

FIG. 4 displays a flow diagram of a registration process implemented in accordance with the teachings of the present invention. FIG. 4 will be discussed in conjunction with FIG. 1. In the registration process as depicted in FIG. 4, at step 400, a mobile node transmits registration information, such as registration request information.

In one embodiment, the registration information includes RFC 3344 mobile node address information, Network Access Identifier (NAI) information, Timestamp information, retransmit bit field status information (i.e., re-transmit bit information), etc. It should be appreciated that the registration information may be any information uniquely identifying a mobile node 100 and in compliance with a registration protocol.

At step 402, the registration request information (i.e., request) is broadcast and/or unicast across the network 104 depending on the radio access network type (i.e., cdma200, PSDN, etc.). At step 404, a foreign agent (106A, 106B), such as an RFC 3344 compliant foreign agent, receives the registration request information. The foreign agent (106A, 106B) broadcasts/unicasts the registration request information across a network 108 that the foreign agent (106A, 106B) is in communication with. At step 406, each home agent (110, 112, 114) on the network 108 receives the registration request information and uses the registration request information as an input to a self-selection method, which operates independently on each home agent (110, 112, 114). In one embodiment, registration request information, such as the time stamp of the registration request, the mobile node home address field (i.e., Home-Address), and the mobile node NAI, are extracted from the registration request information and are used as input to the self-selection method.

The home agent (110, 112, 114) then executes the self-selection method using the registration request information as an input. In one embodiment of the present invention a self-selection method is a method that operates on an apparatus, which enables the apparatus to select itself as the apparatus responsible for delivering a response (i.e., self select). In another embodiment of the present invention a self-selection method is a method that is performed simultaneously by more than one apparatus, which enables at least one of the apparatus to select itself as the apparatus responsible for responding to a message. In yet another embodiment, the self-selection method is a method that enables one of the home agents (110, 112, 114) to select itself as the home agent that should respond to the registration request information (i.e., self select). It should be appreciated that the self-selection method must be installed (i.e., pre-configured) and operating on each home agent (110, 112, 114) prior to receiving the registration request information. In addition, each home agent (110, 112, 114) must be assigned or associated with a range of numbers referred to in the instant application as a "bin." In one embodiment, the self-selection method is characterized by the following pseudocode:

F (Timestamp, Home-Address, NAI, etc.)=VALUE
If (VALUE==within home agent selected range) {
Process RRQ (RRQ);
If (registration successful) {
Send RRP (RRP);
}
}
Else {
Ignore RRQ;
}

As stated in the pseudocode above, the home agent (110, 112, 114) receives the Timestamp, Home-Address, NAI, etc. as input to the self-selection method. It should be appreciated that other unique information may be accessed from the registration request information and used as input to the self-selection method. The self-selection method then generates a VALUE. It should be appreciated that each home agent (110, 112, 114) performing the self-selection method generates the same VALUE. In addition, each home agent (110, 112, 114) has at least one primary, non-overlapping number range or bin associated with the home agent (110, 112, 114). For example, a first home agent (110, 112, 114) may have bin 1-10 associated with the home agent (110, 112, 114), a second home agent (110, 112, 114) may have bin 11-20 associated with the home agent (110, 112, 114), etc. As stated in the pseudocode statement "If (VALUE==within home agent selected range)," each home agent (110, 112, 114) checks to determine if the VALUE (i.e., calculated number) is within the bin (i.e., range of numbers) associated with the home agent (110, 112, 114). Using the example defined above, if the VALUE calculated by the self-selection method is the number "7," the first home agent (110, 112, 114) with bin range 1-10 would be identified as the self-selected home agent (i.e., responding home agent). Once the VALUE falls within the bin of the home agent (110, 112, 114), the self-selected home agent processes the registration request (i.e., in the pseudocode as Process RRQ (RRQ)). Once the registration is successful (i.e., in the pseudocode as "If (registration successful) Send RRP (RRP);)," the self-selected home agent transmits registration response information as stated at step 408 of FIG. 4. If the VALUE does not fall within the bin of the home agent (110, 112, 114), then the home agent (110, 112, 114) will ignore the registration request (i.e., in the pseudocode as "Else {Ignore RRQ;}). As such, once the bin associated with each home agent (110, 112, 114) is unique and/or non-overlapping, one home agent (110, 112, 114) will respond to the registration request information. At step 410, the foreign agent (106A, 106B) receives the response and communicates the response back to the mobile node 100. Lastly, at step 412, the mobile node 100 receives the response from the self-selected home agent.

Using the network architecture of FIG. 1 to implement the method depicted in FIG. 4, the mobile node 100 may communicate an RFC 3344-compliant registration request. A foreign agent, such as foreign agent 106A and/or foreign agent 106B, may receive the registration request. The foreign agent 106A/106B will broadcast the registration request onto the network 108. Each of the home agents 110, 112, and 114 receives the registration request. Each home agent (110, 112, and 114) has a self-selection method (i.e., algorithm) running on the home agent. Each home agent 110, 112 and 114 may then use information included in the registration request, such as the Timestamp, Home-Address, NAI, etc., as input into the self-selection method running on each home agent. As a result of running the self-selection method, each home agent 110, 112, and 114 generates the same VALUE (i.e., the same input plus the same self-selection method produces the same VALUE). A bin is associated with each home agent. For example, Table 1 details an embodiment of bin arrangements associated with home agents 110, 112, and 114.

TABLE I

| Home Agent | Bin Range |
|---|---|
| Home agent 110 | 1-100 |
| Home agent 112 | 101-200 |
| Home agent 114 | 201-300 |

If the VALUE generated by the self-selection method running on each home agent (110, 112, 114) is 157, the VALUE is within the bin range of home agent 112. As a result, home agents 110 and home agent 114 will ignore the registration request and home agent 112 will respond to the registration request. Home agent 112 will then communicate through the foreign agent (106A, 106B), across the network 104, through the wireless interface 102, to the mobile node 100.

The self-selection method randomly and uniformly generates VALUEs within a predefined range. Since the VALUEs (i.e., numbers) are generated uniformly, each home agent (110, 112, 114) responds with approximately the same frequency as another home agent. Therefore, no home agent (110, 112, 114) has a preference over another home agent (110, 112, 114). As a result, during registration, load balancing is achieved across the home agents (110, 112, 114). Therefore, the self-selection method may be used to implement load balancing during the registration process.

Figure 5:
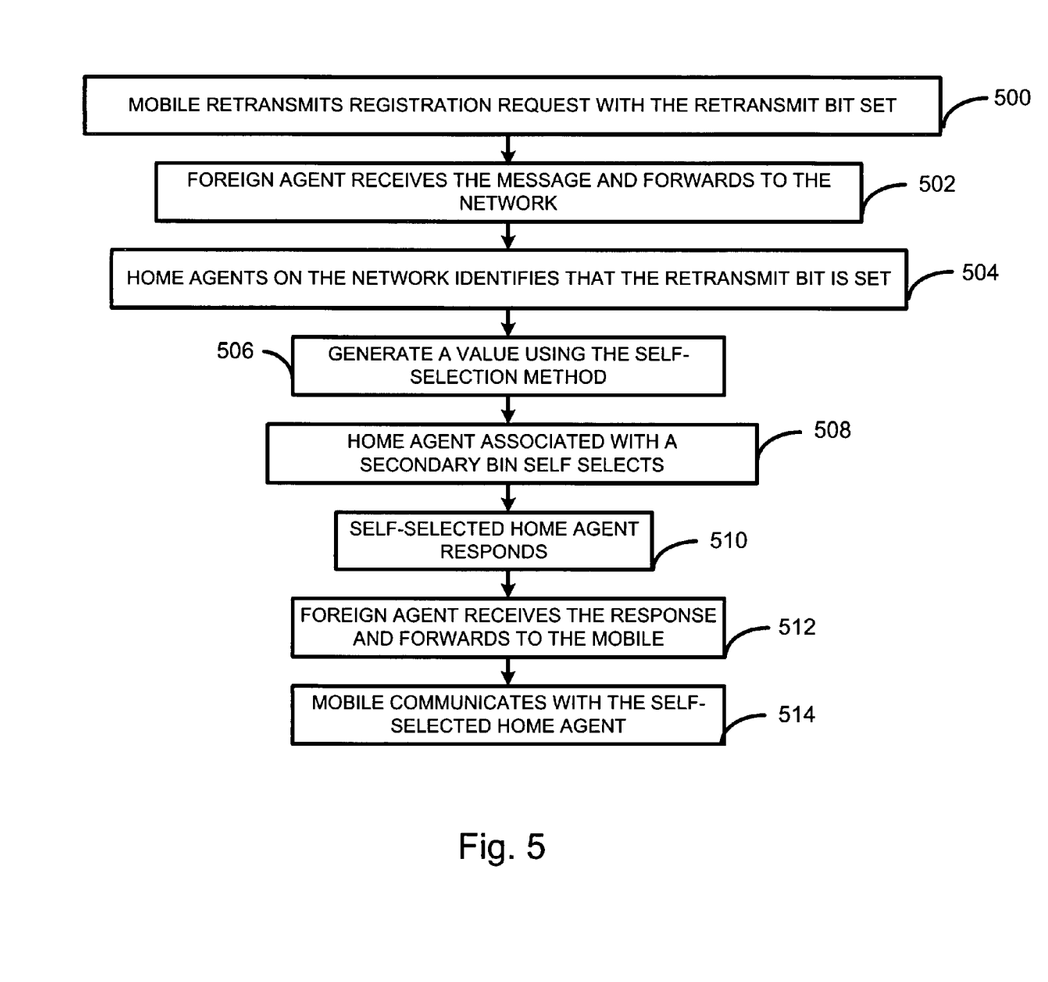
FIG. 5 displays a flow diagram detailing an alternate registration process implemented in accordance with the teachings of the present invention.

FIG. 5 displays a flow diagram detailing an enhanced registration process implemented in accordance with the teachings of the present invention. FIG. 5 will be discussed in conjunction with FIG. 1. In one embodiment, the method depicted by the flow diagram of FIG. 5 is required to recover from a failure of the home agent that is responsible for registering a mobile node. At step 500, the mobile node 100 retransmits the registration information with a new time stamp and/or with the re-transmit bit set. The mobile node 100 may retransmit new registration information, such as a new registration request, for a number of reasons. For example, the home agent (110, 112, 114) may have stopped communicating, the mobile node 100 may have reached a predefined time limit (i.e., set by RFC 3422) and a retransmission is generated, a component in the network may have failed and rerouting has occurred, etc. The mobile node 100 may also include the time between registration request, the number of registration requests, the number of re-transmitted registration requests, etc. In one embodiment, this additional information may be used to assist a backup (i.e., secondary) home agent to respond appropriately. For example, the additional information may be used to prevent multiple home agents from registering the same mobile node 100 when re-transmitted requests are sent too soon and the link between the mobile node 100 and the home agent has a significant amount of delay.

In FIG. 5, at step 502, the foreign agent (106A, 106B) receives the retransmitted registration information (i.e., retransmission of a registration request) and forwards the retransmitted registration information. At step 504, each home agent (110, 112, 114) receives the retransmitted registration information and identifies the retransmitted registration information as a retransmission of a previous registration request based on the retransmit bit field information, the time between registration request, the number of registration requests, the number of re-transmitted registration requests thus far, etc. In one embodiment, the retransmit bit field is set in the retransmitted registration information.

Once the home agents (110, 112, 114) receive the retransmitted registration information, a VALUE may be generated by the self-selection method as stated at 506. A tiered bin recovery method may then be implemented as stated at 508. In a tiered bin method, each home agent (110, 112, 114) is configured with a secondary bin. The secondary bin replicates the bin of at least one other home agent (110, 112, 114). In one embodiment, the mobile node 100 does not receive a response to an initial registration request. As a result, the mobile node 100 retransmits registration information. Each home agent (110, 112, 114) receives the retransmitted registration information. In one embodiment, each home agent (110, 112, 114) determines that the information is a retransmission of the registration information by checking to determine that the retransmit bit field is set. In another embodiment, each home agent (110, 112, 114) determines that the information is a retransmission of the registration information based on the time elapsed from the initial registration attempt by the mobile station, the number of registration attempts, etc. The home agent then performs the self-selection method using the received re-transmitted registration information (i.e., re-transmitted registration request). If the VALUE falls within the secondary bin, the home agent (110, 112, 114) responds to the mobile node 100. As stated at 508, the home agent (110, 112, 114) associated with the secondary bin self selects. The home agent (110, 112, 114) that has secondary responsibility for the bin will self-select (i.e., self-selected home agent) and respond to the retransmitted registration information as stated at 510.

At 512, the foreign agent (106A, 106B) receives the response and forwards the response to the mobile node 100 that generated the retransmitted registration information. At step 514, the mobile node 100 communicates with the home agent (110, 112, 114) that responded to the retransmitted registration information.

Table II given below details a sample configuration for a tiered bin method.

TABLE II

| Home Agent | Primary Bin | Secondary Bin |
|---|---|---|
| Home agent 110 | 1-100 | 101-200 |
| Home agent 112 | 101-200 | 201-300 |
| Home agent 114 | 201-300 | 1-100 |

In Table II, home agent 110 is associated with a primary bin of 1-100 and a secondary bin of 101-200. Home agent 112 is associated with a primary bin of 101-200 and a secondary bin of 201-300. Home agent 114 is associated with a primary bin of 201-300 and a secondary bin of 1-100. In the tiered bin recovery method, each home agent 110, 112, and 114 receives the retransmitted registration information. Each home agent (110, 112, 114) identifies the retransmitted registration information as a retransmission of a previous registration request by checking the set re-transmit bit field, etc in the message header of an RFC 3344 compliant packet. In addition, in one embodiment, some optional Normal Vendor Specific Extensions that are included in the re-transmitted registration request may help the home agent assess (110, 112, 114) how long the mobile node has been trying to register (elapsed duration) and how many times the mobile node has attempted to register. On receipt of the retransmitted registration information (i.e., the first retransmission of a registration request), the home agent (110, 112, 114) with secondary responsibility will self-select and generate a response. In one embodiment, the information about the elapsed duration and the number of retries that may be included in the re-transmitted registration request will be analyzed by the home agent before responding to a re-transmitted registration request.

For example, if the initial VALUE generated by the initial registration request was 157, home agent 112 would self-select and respond because home agent 112 has responsibility for bin 101-200. On a retransmission of the registration request, home agent 110 would self-select and respond because home agent 110 has secondary responsibility for bin 101-200. The foreign agent (106A, 106B) then forwards the response to mobile node 100. Once mobile node 100 receives the response, mobile node 100 may communicate with the self-selected home agent 110, 112, or 114.

Figure 6:
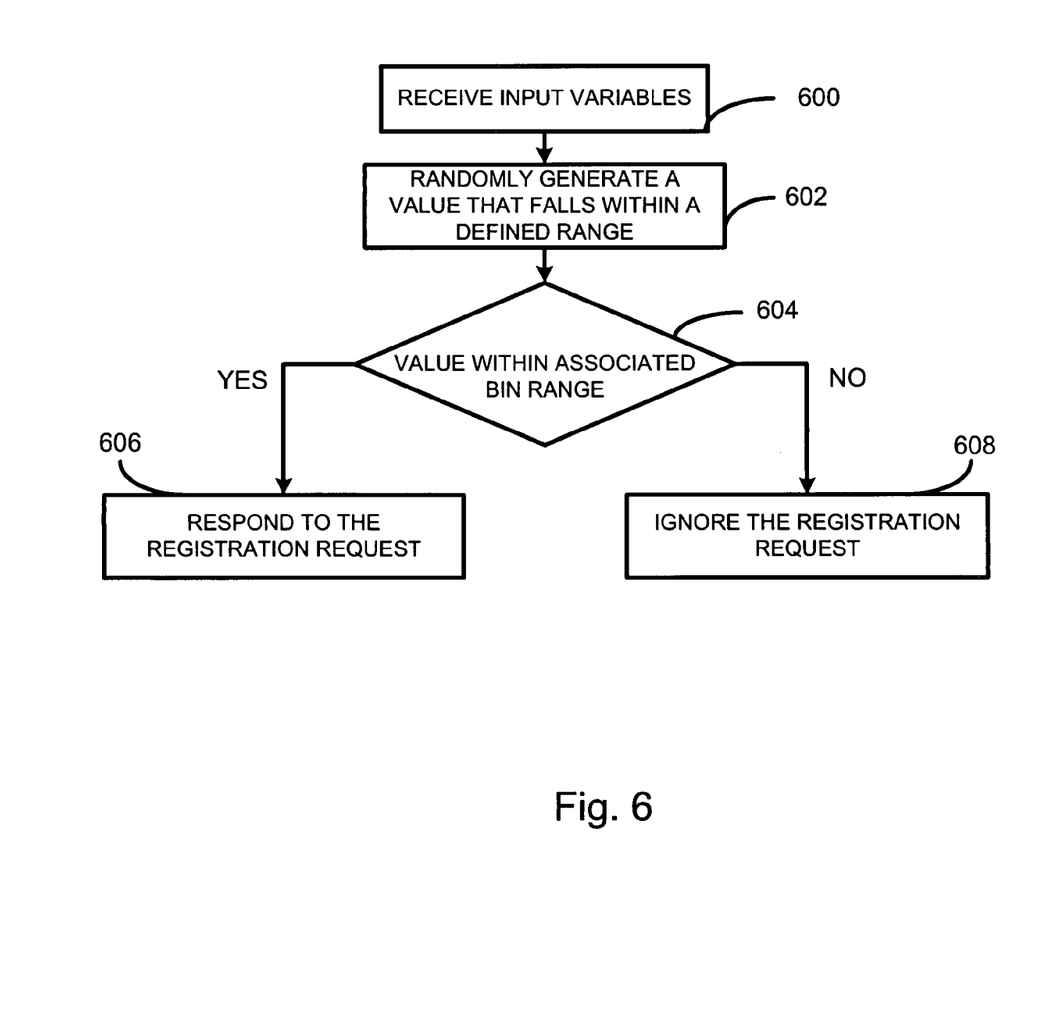
FIG. 6 displays a flowchart detailing a self-selection method implemented in accordance with the teachings of the present invention.

FIG. 6 displays a flowchart depicting a self-selection method implemented in accordance with the teachings of the present invention. During the self-selection method, a number generation method is used to randomly generate a VALUE. The number generation method receives an input and then randomly and uniformly generates numbers that fall within a defined range of numbers. For example, the number generation method will randomly and uniformly generate numbers that fall within the range of 1 to 1000, 100,000 to 1,000,000, 20 to 50, etc.

In one embodiment, the number generation method is implemented with the Pearson Algorithm, Peter K. Pearson, Fast Hashing of Variable-Length Test Strings, CACM, 33(6): 677-680, June 1990. The Pearson Algorithm receives a uniquely identifying input and then randomly and uniformly generates numbers that fall within a defined range of numbers. However, it should be appreciated that any number generation method that receives a uniquely identifying input and then randomly and uniformly generates numbers that fall within a defined range of numbers is within the scope of the present invention. For example, algorithms, such as a perfect hashing algorithm, a round robin algorithm, etc, are within the scope of the present invention.

One implementation of the Pearson Algorithm is given in the C-code provided below:

```c
/* A "mixing table" of 256 distinct VALUEs, in pseudo-random order. */ unsigned char loadb_mx_tbl[256]={
251,175,119,215,81,14,79,191,103,49,181,143,186,157,
0, 232, 31, 32, 55, 60, 152, 58, 17, 237, 174, 70, 160, 144,
220,90, 57, 223, 59, 3, 18, 140, 111, 166, 203, 196, 134, 243,
124, 95, 222, 179, 197, 65, 180, 48, 36, 15, 107, 46, 233, 130,
165, 30, 123, 161, 209, 23, 97, 16, 40, 91, 219, 61, 100, 10,
210,109, 250, 127, 22, 138, 29, 108, 244, 67, 207, 9, 178, 204,
74, 98, 126, 249, 167, 116, 34, 77, 193, 200, 121, 5, 20, 113,
71, 35, 128, 13, 182, 94, 25, 226, 227, 199, 75, 27, 41, 245,
230, 224, 43, 225, 177, 26, 155, 150, 212, 142, 218, 115, 241,
73, 88, 105, 39, 114, 62, 255, 192, 201, 145, 214, 168, 158,
221, 148, 154, 122, 12, 84, 82, 163, 44, 139, 228, 236, 205,
242, 217, 11, 187, 146, 159, 64, 86, 239, 195, 42, 106, 198,
118, 112, 184, 172, 87, 2, 173, 117, 176, 229, 247, 253, 137,
185, 99, 164, 102, 147, 45, 66, 231, 52, 141, 211, 194, 206,
246, 238, 56, 110, 78, 248, 63, 240, 189, 93, 92, 51, 53, 183,
19, 171, 72, 50, 33, 104, 101, 69, 8, 252, 83, 120, 76, 135, 85,
54, 202, 125, 188, 213, 96, 235, 136, 208, 162, 129, 190, 132,
156, 38, 47, 1, 7, 254, 24, 4, 216, 131, 89, 21, 28, 133, 37, 153,
149, 80, 170, 68, 6, 169, 234, 151};
unsigned char loadb_p_hash(
    const unsigned char *key, /* The key to be hashed */
    const int len)/* Key length in bytes */
{
unsigned char hash len;
int i;
    for (i=len; i>0;)
    hash=loadb_mx_tbl [hash ^ key[--i]];
    return( hash);
}
int accept_service_request(
    const unsigned char HBA[32], /* The hash bucket bitmap */
    const unsigned char *key, /* The service transaction id */
    const int len)/* length of the above */
{
unsigned char hash=loadb_13 p_hash(key,len);
int index =(hash >>3) & 31;
int bitmask =1<<(hash & 7);
    /* return 1 if we should service this transaction */
    return((HBA[index] & bitmask) !=0);
}
```

FIG. 6 displays a flowchart of a self-selection method implemented in accordance with the teachings of the present invention. At step 600, a home agent running the self-selection method depicted in FIG. 6 receives input variables from a registration request. As stated at 602, a number generation method, such as the Pearson Algorithm, is used to randomly generate a VALUE that falls within a defined range. At 604, a test is then performed by each home agent to determine if the VALUE falls within a bin associated with the home agent. If the VALUE does fall within the bin of the home agent, then the home agent responds to the registration request as stated at 606. If the VALUE does not fall in the bin associated with the home agent, then the home agent ignores the registration request as stated at 608.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of registering a mobile node comprising:
   receiving registration information;
   executing a self-selection method on an apparatus in response to receiving the registration information, the self-selection method enabling the apparatus to select itself as a home agent; and
   responding to the registration information in response to performing the self-selecting.

2. A method of registering a mobile node as set forth in claim 1, wherein the registration information is RFC 3422 compliant information.

3. A method of registering a mobile node as set forth in claim 1, wherein the registration information comprises timestamp information.

4. A method of registering a mobile node as set forth in claim 1, wherein the registration information comprises network access identifier information.

5. A method of registering a mobile node as set forth in claim 1, wherein the registration information comprises mobile address information.

6. A method of registering a mobile node as set forth in claim 1, wherein the self-selection method comprises performing a perfect hashing algorithm.

7. A method of registering a mobile node as set forth in claim 1, wherein the self-selection method comprises performing a round robin algorithm.

8. A method of registering a mobile node as set forth in claim 1, wherein the self-selection method comprises performing a Pearson algorithm.

9. A method of registering a mobile node as set forth in claim 1, the self-selection method further comprising:
   generating a value;
   determining that the value is within a range of numbers; and
   responding to the registration information in response to determining that the value is within the range of numbers.

10. A method of registering a mobile node as set forth in claim 1, wherein load balancing is performed in response to performing the method of registering a mobile node.

11. A method of registering a mobile node as set forth in claim 1, the self-selection method further comprising:
    generating a value that falls within a range of numbers;
    comparing the value to a predefined range of numbers; and
    if the value falls within the predefined range of numbers responding to the registration information.

12. A method of registering a mobile node as set forth in claim 11, wherein the value is randomly generated.

13. A method of registering a mobile node comprising:
    receiving registration information at a home agent;
    generating a value that falls within a range of numbers in response to receiving the registration information;
    comparing the value to a predefined range of numbers in response to generating the value; and if the value falls within the predefined range of numbers, responding to the registration information.

14. A method of registering a mobile node as set forth in claim 13, wherein the predefined range of numbers is a bin.

15. A method of registering a mobile node as set forth in claim 13, wherein the value is randomly generated.

16. A method of registering a mobile node comprising:
receiving registration information at a home agent;
identifying the registration information as a retransmission of a registration request in response to receiving the registration information;
generating a value in response to identifying the registration information as a retransmission of a registration request;
comparing the value to a predefined range of numbers in response to generating the value; and
if the value falls within the predefined range of numbers, responding to the registration information.

17. A method of registering a mobile node as set forth in claim 16, wherein the predefined range of numbers is a secondary bin.

18. A method of registering a mobile node as set forth in claim 16, wherein identifying the registration information as a retransmission of a registration request is performed in response to checking a retransmission bit field.

19. A method of registering a mobile node as set forth in claim 16, wherein identifying the registration information as a retransmission of a registration request is performed in response to determining time elapsed from an initial registration attempt.

20. A method of registering a mobile node as set forth in claim 16, wherein identifying the registration information as a retransmission of a registration request is performed in response to identifying a number of registration attempts.

21. An apparatus comprising:
an input interface configured for receiving registration information;
a processing unit configured for self-selecting the apparatus as a home agent in response to receiving the registration information and for responding to the registration information in response to performing the self-selecting.

22. An apparatus as set forth in claim 21, wherein the apparatus is a home agent.

23. An apparatus as set forth in claim 21, wherein the apparatus is a wireless device.

24. An apparatus as set forth in claim 21, wherein the apparatus is a wireline device.

25. An apparatus comprising:
an input interface configured for receiving registration information at a home agent; and
a processor configured to:
identify the registration information as a retransmission of a registration request in response to receiving the registration information;
generate a value in response to identifying the registration information as a retransmission of a registration request;
compare the value to a predefined range of numbers in response to generating the value; and
if the value falls within the predefined range of numbers, respond to the registration information.

26. An apparatus as set forth in claim 25, wherein the apparatus is a wireless device.

27. An apparatus as set forth in claim 25, wherein the apparatus is a wireline device.

28. A method of registering a mobile node comprising:
receiving registration information at a home agent;
identifying the registration information as a retransmission of a registration request in response to receiving the registration information, wherein identifying the registration information as a retransmission of a registration request is performed in response to at least a one of checking a retransmission bit field, determining time elapsed from an initial registration attempt and identifying a number of registration attempts;
generating a value in response to identifying the registration information as a retransmission of a registration request;
comparing the value to a predefined range of numbers in response to generating the value; and
if the value falls within the predefined range of numbers, responding to the registration information.

* * * * *